US008232346B2

(12) United States Patent
Duffy et al.

(10) Patent No.: US 8,232,346 B2
(45) Date of Patent: Jul. 31, 2012

(54) AQUEOUS SILICONE EMULSION, PROCESS FOR PREPARING AND USE AS A WATER-REPELLENT AND ANTI-ADHESIVE PAPER COATING BASE

(75) Inventors: Sean Duffy, Lyons (FR); André Lievre, St-Genis Laval (FR); Christian Mirou, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 641 days.

(21) Appl. No.: 11/029,061

(22) Filed: Jan. 4, 2005

(65) Prior Publication Data
US 2005/0119406 A1 Jun. 2, 2005

Related U.S. Application Data

(63) Continuation of application No. 10/386,061, filed on Mar. 11, 2003, now abandoned, which is a continuation of application No. 09/582,594, filed on Aug. 17, 2000, now abandoned.

(30) Foreign Application Priority Data

Dec. 31, 1997 (FR) ...................................... 97 16872

(51) Int. Cl.
  *C08J 3/00* (2006.01)
  *C08J 3/03* (2006.01)
  *C08L 83/04* (2006.01)
  *D21H 19/12* (2006.01)
  *C09D 183/04* (2006.01)
  *B01F 3/08* (2006.01)
  *C09B 67/00* (2006.01)

(52) U.S. Cl. ............ 524/837; 524/588; 528/15; 528/31; 516/72

(58) Field of Classification Search .................. 516/72; 524/837, 588; 528/15, 31
See application file for complete search history.

(56) References Cited

U.S. PATENT DOCUMENTS

| 4,433,007 | A | | 2/1984 | Marwitz | 524/837 |
|---|---|---|---|---|---|
| 4,791,029 | A | * | 12/1988 | Fau et al. | 428/447 |
| 4,978,710 | A | * | 12/1990 | Liles | 524/837 |
| 5,071,885 | A | | 12/1991 | Johnson | 521/177 |
| 5,095,067 | A | | 3/1992 | Hara | 524/506 |
| 5,500,148 | A | | 3/1996 | Ohba | 516/76 |
| 5,827,921 | A | | 10/1998 | Osawa | 524/837 |
| 5,916,687 | A | | 6/1999 | Takanashi | 524/837 |

FOREIGN PATENT DOCUMENTS

| EP | 0 253 747 | 1/1988 |
|---|---|---|
| EP | 0319 981 | 6/1989 |
| EP | 0 587 462 | 3/1994 |
| GB | 1 599 209 | 9/1981 |

OTHER PUBLICATIONS

Skoog, West and Holler, "Fundementals of Analytical Chemistry", (Saunders College Publishing, NY, NY, Copyright date 1988), (month unavailable-1988), pp. 225 and 226.*
International Search Report of Parent PCT/FR98/02858, Apr. 1999, EPO, NL.

* cited by examiner

*Primary Examiner* — Daniel S Metzmaier
(74) *Attorney, Agent, or Firm* — SNR Denton, US LLP

(57) ABSTRACT

The invention relates to an aqueous silicone emulsion comprising polyorganosiloxanes (POS) with Si-vinyl units and POS with SiH units, cross-linkable by polyaddition in the presence of a platinum catalyst. The emulsion also contains an agent (e.g., buffer) for setting and maintaining pH between 5 and 9 in an amount sufficient to eliminate or significantly reduce foam or gel formation; an emulsifying agent; optionally a polyaddition inhibitor and other additives such as a filler, biocide, antifoam, anti-freeze, coloring agent, synthetic latex. The emulsions can comprise three different families of dispersed silicone phase droplets (e.g., polyorganosiloxane (A), polyorganosiloxane (B) and catalyst). Such emulsions can be used in the preparation of anti-adherent coating on fibrous or non fibrous supports. The invention also concerns a method for preparing said emulsions and methods for coating supports, for example paper, using said emulsion.

14 Claims, No Drawings

AQUEOUS SILICONE EMULSION, PROCESS FOR PREPARING AND USE AS A WATER-REPELLENT AND ANTI-ADHESIVE PAPER COATING BASE

This application is a continuation of U.S. application Ser. No. 10/386,061, filed on Mar. 11, 2003, now abandoned, which is a continuation of U.S. application Ser. No. 09/582,594, filed on Aug. 17, 2000, now abandoned, which was filed under 35 U.S.C. 371 as PCT/FR98/02858, filed 23 Dec. 1998 and claims priority to French application No. 97/16872, filed 31 Dec. 1997.

The field of the invention is that of crosslinkable or crosslinked silicone compositions capable of being used in particular for forming a water-repellent and anti-adhesive coating or film for a fibrous or non-fibrous substrate, for example made of paper or the like, or alternatively made of natural or synthetic polymer.

More specifically, the invention relates to aqueous silicone dispersions or emulsions of the type of that comprising:
  polyorganosiloxanes (POSs) carrying, on the same molecule at least, SiH and SiEU units with EU representing a group comprising at least one ethylenic unsaturation, preferably a vinyl unsaturation;
  a metal catalyst (C), preferably a platinum catalyst;
  hydroxyl radicals capable of reacting with SiH units by dehydrogenation/condensation.

The invention also relates to the preparation of aqueous silicone emulsions of this type.

Processes for the manufacture of articles made of crosslinked silicone, in particular coatings, e.g. water-repellent and/or anti-adhesive coatings for fibrous or non-fibrous substrates (paper), from the emulsion targeted above are also targeted by the present document.

Polyorganosiloxanes are known for their ability to render surfaces of various substrates anti-adhesive (e.g. paper, cloth, polymer film or others). Anti-adhesive treatments are easy to carry out with silicones as the latter can be provided in the form of a crosslinkable liquid polymer, solution or emulsion which are easy to apply to and spread over substrates at an industrial rate and on an industrial scale. This is why silicone compositions are used, for example, as a mould-release agent, in particular in the manufacture of tyres and in the injection of plastics, or alternatively for the coating of metal moulds used in the pastry industry or of racks in baker's ovens, or finally for the preparation of adhesive-protective paper (label, decorative paper), of paper inserts for the handling of sticky masses (laminate, raw rubber) or of anti-adhesive paper for the baking of pastries. By way of illustration, it may be indicated that Applications or Patents U.S. Pat. No. 4,347,346, EP-A-0,219,720, EP-A-0,454,130 and EP-A-0,523,660 disclose polyorganosiloxanes intended to be used in a paper anti-adhesive application.

The silicone compositions according to the prior art targeted hereinabove are employed in this field of paper anti-adhesiveness in the form of emulsion baths (or coating baths) which serve to coat substrates with films which are subsequently crosslinked under thermal activation to form the water-repellent and anti-adhesive coating.

The aqueous silicone emulsion systems more particularly concerned with in the context of the present account are those comprising polyorganosiloxanes (POSs) with SiH units and POSs with Si-vinyl units. These systems conventionally polymerize by platinum catalysis according to an SiH/SiVi polyaddition mechanism (also known as hydrosilylation).

Apart from the SiH POSs and the SiVi POSs and the platinum catalyst, these emulsions comprise one or more water-soluble constituents, such as hydroxyethylcellulose, starch, poly(vinyl alcohol), and the like, having in particular an emulsifying, thickening and stabilizing role but also the role of promoting two conflicting effects, namely: anti-adhesiveness and printability.

The stability of these silicone emulsions comprising the SiH and SiVi reactive constituents and the platinum catalyst (C) can also be conditioned by the presence of an inhibitor of the polyaddition reaction.

These emulsions naturally comprise surfactants.
Various additives can also be added thereto, e.g.:
  emulsified synthetic polymers (latices) of use in particular in modifying the rheological behaviour of the bath,
  antigelling agents,
  wetting agents,
  bactericides
  acidifying agents,
  antifoams, and the like.

According to an axiom commonly accepted in the state of the art, these aqueous silicone emulsion baths must be acidic, that is to say have a pH of less than 5.

In point of fact, it is found that such silicone emulsion baths are subject to a degree of chemical instability which is reflected by the production of undesirable (chemical) foams and gels. In fact, it is easily understood that these gels and these foams present real difficulties during their use in industrial coating equipment. Moreover, this seriously harms the quality of the coating and thus the final performance of the substrate (e.g. paper) which has been treated with silicone by means of these unstable emulsion baths.

It is believed that these undesirable foams result from side reactions, which side reactions are dehydrogenation/condensations (DHCs) between the SiH groups of the POSs present in the bath and hydroxyl groups which are contributed by the water, by emulsifying agents, thickening agents, stabilizing agents or other anti-adhesiveness promoters, such as poly(vinyl alcohol)s, by crosslinking inhibitors, such as, for example, ethynylcyclohexanol (ECH), or by wetting and/or antigelling additives, such as propylene glycol, among others. These DHCs result in the formation of hydrogen gas, itself the source of undesirable foaming.

The formation of a gel arises, for its part, more particularly from premature addition reactions between SiVi units and SiH units which result in the bridging of silicon atoms, leading to the increase in the viscosity which appears through the gels. This is because the consumption of the polyaddition inhibitor (e.g. ethynylcyclohexanol) by the hydroxyl groups also destabilizes the bath because the polyaddition reaction is initiated in the bath, whereas it should only take place on the substrate after heating. Gelling therefore takes place, which gelling is harmful to the quality of the spreading of the emulsion over the substrate. The effect of this is to lessen the anti-adhesive performance of the substrate which has been treated with silicone. It should be noted that the condensation of Si—OH units with one another to form Si—Si bridgings can itself also contribute to the gelling. These SiOH units originate from the reaction of the SiHs with the OH groups present in the medium.

It is understood that, in addition to the fact that these foams and these gels are ruinous to the use, they indicate the consumption of SiH groups, which groups will consequently no longer be available for the polyaddition reaction which results in the desired crosslinking as a thin layer, such as, for example, in the form of a coating. This therefore results directly in a loss in reactivity of the emulsion.

The aqueous silicone emulsion baths of the state of the art furthermore suffer from another major disadvantage, which is a physical instability, in combination with the chemical instability mentioned hereinabove. This is because, as soon as the emulsion is subjected to shearing (stirring), which is in particular the case when the emulsion circulates in industrial coating equipment and in particular when they are in the coating heads of industrial equipment, a phenomenon of coalescence of the droplets occurs. Gelling consequently occurs, resulting in a loss in reactivity and a lower quality of the coating, in particular with regard to anti-adhesiveness. This phenomenon is aggravated by the fact that the temperature of the emulsion can increase as it circulates in industrial coating equipment. This gelling and this loss in reactivity, which are related to the shear stress, themselves also result from the consumption of the SiHs by side reaction with the OHs present.

Under these circumstances, it was strongly assumed in the state of the art that the least harmful storage pH for these silicone emulsions is a pH of less than 5, as it was unanimously accepted that dehydrogenation/condensations are inhibited at acidic pH.

The Applicant Company was not resigned to accepting this undesirable situation as regards chemical and physical stability of aqueous silicone emulsion baths comprising SiH POSs, SiVi POSs and OH providers, promoting side DHCs and subsequently the formation of undesirable foams and gels.

The Applicant Company therefore set itself the essential objective of providing aqueous silicone emulsions of the type of those mentioned hereinabove but which, in contrast to the latter, are stable and which do not give rise to the known undesirable phenomena of formation of chemical foams, of gels and of coalescence.

Another essential objective of the present invention is to provide aqueous silicone emulsions which comprise POSs with SiH units, POSs with SiVi units and OH providers and which are nevertheless stable, without losing sight of the need to be inexpensive and easy to prepare.

Another essential objective of the present invention is to provide aqueous silicone emulsions of the type of those targeted hereinabove which are of use in particular in the production of anti-adhesive coatings for a fibrous or non-fibrous substrate (e.g. paper), which result, after crosslinking by SiH/SiVi polyaddition, in anti-adhesive and water-repellent polymer films which are correctly attached to their substrates and which exhibit optimum qualities as regards anti-adhesiveness, water-repellency, printability and mechanical characteristics (hardness).

Another essential objective of the present invention is to provide a process for the preparation of aqueous silicone emulsions, in particular of the type of those mentioned hereinabove, the said process having to introduce a simple, economical and effective solution to the instability problems which are the source of the undesirable foaming and of the undesirable gelling.

Another essential objective of the present invention is to provide a process for producing objects made of polymerized/crosslinked silicone which are obtained from aqueous silicone emulsions of the type of those mentioned above, it being possible for these objects to be in particular anti-adhesive coatings for a substrate, for example made of paper, the objects obtained by the said process having to exhibit optimum mechanical properties and, in particular in the case of anti-adhesive coatings, the most suitable possible anti-adhesive and water-repellent properties.

To succeed in achieving these objectives, the Inventors have had to give evidence of high inventive merit, since it was necessary for them to go against the technical preconception firmly rooted in standard practices, according to which the acidic pH is the only one which can be suitable with regard to the stabilization of the aqueous silicone emulsions under consideration.

Thus it is that they have demonstrated in an entirely surprising and unexpected way that the solution to the technical problem at the basis of the invention involved fixing and maintaining the pH of the emulsion in a range of pHs equal to or greater than 5 and judiciously confined within the interval 5-9. In fact, the Inventors have noticed that the preconception of stability and acidic pH was only valid in the absence of platinum and that it could not be transposed to the case where platinum is present.

The result of this is that the present invention firstly relates to an aqueous silicone emulsion which can be used in particular as coating base for the preparation of water-repellent and anti-adhesive coatings, this emulsion being of the type of that comprising:
- at least one polyorganosiloxane (A) (POS) carrying Si-EU units with EU representing a group comprising at least one ethylenic unsaturation, preferably a vinyl unsaturation, and at least one POS (B) carrying SiH units; the latter being capable of reacting by polyaddition with the SiEU units,
- a metal catalyst (C), preferably a platinum catalyst,
- hydroxyl radicals capable of reacting with SiH units by dehydrogenation/condensation,
  - characterized in that it additionally comprises at least one agent (T) for fixing and maintaining the pH between 5 and 9, preferably between 5.5 and 8.5 and more preferably still between 6 and 8, this agent advantageously being a buffer system.

It should be noted that a person skilled in the art was even less inclined to adopt the solution recommended by the invention, which proceeds from a basification of the emulsion comprising a metal catalyst (preferably a platinum catalyst), because it was well known that SiH groups are very unstable in the presence of hydroxyl groups in media of pH$\geq$5. The Inventors have shown that this is only true in reality in the absence of platinum.

This only strengthens the unforeseeable nature of the effect resulting from the provision in accordance with the invention of using a means for controlling the pH within a given range, in order to limit the side reactions described hereinabove, without, however, destroying the SiH groups.

The means of the invention is preferably a buffer system which it is advisable to choose in an appropriate way according to the composition and the pH of the aqueous silicone emulsion under consideration.

The improvement in the stability of the emulsion obtained by virtue of the invention is reflected directly by a significant fall in the foaming and in the gelling.

The invention makes it possible to reduce the amounts of catalyst C employed because of the stabilization in the level of SiH resulting therefrom. It is therefore no longer necessary to dope the medium with catalyst C.

According to a preferred characteristic of the invention, the non-aqueous dispersed silicone phase of the emulsion exhibits the following qualitative composition:
- (A) at least one POS carrying, per molecule, at least two Si-EU units;
- (B) at least one POS carrying, per molecule, at least two, preferably at least three, Si—H units;
- (C) a metal catalyst, preferably a platinum catalyst;
- (T) the agent or agents for fixing and maintaining the pH;
- (D) at least one emulsifying agent preferably chosen from surfactants and/or protective colloids, and more preferably still from poly(vinyl alcohol)s (PVAs);

(E) optionally at least one stabilizer for the polyaddition reaction;

(F) optionally one or more additives.

If interest is shown in the preferred quantitative characteristics of the emulsion according to the invention, it should also be pointed out that the dispersed silicone phase of this emulsion has the following quantitative composition (as dry weight with respect to the total mass of the POS A and POS B):

(C) 30 to 200, preferably 50 to 150 and more preferably 80 to 120 ppm;

(D) 0.01 to 10, preferably 0.05 to 5, parts per 100 parts;

(E) 0 to 5000, preferably 500 to 2000, ppm;

(F) 0 to 10, preferably 0 to 5, ppm.

→A and B being present in amounts such that the SiH/SiVi molar ratio is between 1 and 5, preferably between 1 and 3 and more preferably between 1.5 and 2;

→T being present in an amount sufficient to maintain the pH in the targeted window.

The emulsions according to the invention make it possible to obtain, after coating and crosslinking, anti-adhesive and water-repellent surfaces. Furthermore, the crosslinked coatings thus produced are relatively insensitive to temperature. They additionally profit from good mechanical properties (e.g. hardness).

It will have been understood that these are the base silicone products which constitute the essence of the dispersed phase of the aqueous emulsions under consideration in the present account.

The droplets of silicone phase which form this dispersed phase can correspond to several alternative composition forms, according to the number and the nature of the silicone products which they comprise.

According to a preferred embodiment of the invention, the emulsion comprises at least three different families of droplets of dispersed silicone phase:

*$d_1$* essentially composed of POS A and devoid of catalyst C;

*$d_2$* essentially composed of POS B and devoid of catalyst C;

*$d_3$* comprising the catalyst C;

the droplets of at least one of these families comprising at least one stabilizer E.

The stabilizer E is there as inhibitor of the Si—H/Si-EU polyaddition (with EU=Vi, for example), in order to allow the emulsion to be able to be stored under normal atmospheric conditions in the form of a single-constituent, ready-for-use system. E is added either in one of the precursor constituents of the single-constituent system or directly to the latter.

The stabilizer E is advantageously present in the same droplets as those which comprise the POS A with Si-EU units, preferably Si-vinyl units.

The agent T for fixing and maintaining the pH is preferably a buffer system comprising $HCO_3^-/CO_3^{2-}$ and/or $H_2PO_4^-/HPO_4^{2-}$. Thus, in order to obtain the desired buffer effect, it will be advisable to introduce, in accordance with the invention, a $HCO_3^-$ and/or $H_2PO_4^{2-}$ salt, such as, for example, $NaHCO_3$ and/or $Na_2CO_3$ and/or $NaH_2PO_4$ and/or $Na_2HPO_4$. It is obvious that any other salt with a different counteranion (e.g. K) could be suitable. In a particularly preferred way, use is in practice made of a buffer system composed of $NaHCO_3$ which is incorporated in the emulsion.

According to an alternative form, the buffer system can be a means which makes it possible to ensure regulation of the pH of the emulsion by monitoring the change in its pH and by correcting its variations by incorporation in the emulsion of appropriate amounts of at least one agent (T) which can be an acid or a base according to the direction in variation of the pH.

The acid or the base added to the emulsion according to requirements as agent (T) for the exogenous regulation of the pH can be inorganic or organic. It can also be a strong (or weak) acid salt or strong (or weak) base salt. Mention may be made, as examples of strong bases, of: triethanolamine, sodium hydroxide or potassium hydroxide.

As regards the POSs, preferably A and B, employed in the emulsion according to the invention, it should be noted that the POS A is by weight one of the essential ingredients of the emulsion.

This POS A is advantageously a product comprising units of formula:

(A.1)

in which:

W is an alkenyl group, preferably a vinyl or allyl group,

Z is a monovalent hydrocarbonaceous group which has no unfavourable effect on the activity of the catalyst and which is preferably chosen from alkyl groups having from 1 to 8 carbon atoms inclusive, advantageously from methyl, ethyl, propyl and 3,3,3-trifluoropropyl groups, and from aryl groups, advantageously from xylyl and tolyl and phenyl radicals, a is 1 or 2, b is 0, 1 or 2 and a+b is between 1 and 3, optionally at least a portion of the other units being units of average formula:

(A.2)

in which Z has the same meaning as hereinabove and c has a value of between 0 and 3, for example between 1 and 3.

Z is generally chosen from methyl, ethyl and phenyl radicals, 60 molar % at least of the Z radicals being methyl radicals.

It is advantageous for this polydiorganosiloxane to have a viscosity (at 25° C.) at least equal to 10 mPa·s, preferably to 1000 mPa·s and more preferably still of between 5000 and 200,000 mPa·s.

All viscosities concerned with in the present account correspond to a so-called "Newtonian" dynamic viscosity quantity at 25° C., that is to say the dynamic viscosity which is measured, in a way known per se, at a shear rate gradient which is sufficiently low for the viscosity measured to be independent of the rate gradient.

The polyorganosiloxane A can be formed solely of units of formula (A.1) or can additionally comprise units of formula (A.2). Likewise, it can exhibit a linear, branched, cyclic or network structure. Its degree of polymerization is preferably between 2 and 5000.

Examples of siloxyl units of formula (A.1) are the vinyldimethylsiloxane unit, the vinylphenylmethylsiloxane unit and the vinylsiloxane unit.

Examples of siloxyl units of formula (A.2) are the $SiO_{4/2}$, dimethylsiloxane, methylphenylsiloxane, diphenylsiloxane, methylsiloxane and phenylsiloxane units.

Examples of polyorganosiloxanes A are the dimethylpolysiloxanes with dimethylvinylsilyl ends, the methylvinyldimethylpolysiloxane copolymers with trimethylsilyl ends, the methylvinyldimethylpolysiloxane copolymers with dimethylvinylsilyl ends and cyclic methylvinylpolysiloxanes.

The polyorganosiloxane B is preferably of the type of those comprising siloxyl units of formula:

$$H_d L_e SiO_{\frac{4-(d+e)}{2}} \quad (B.1)$$

in which:
L is a monovalent hydrocarbonaceous group which has no unfavourable effect on the activity of the catalyst and which is preferably chosen from alkyl groups having from 1 to 8 carbon atoms inclusive, advantageously from the methyl, ethyl, propyl and 3,3,3-trifluoropropyl groups, and from aryl groups, advantageously from the xylyl and tolyl and phenyl radicals,
d is 1 or 2, e is 0, 1 or 2 and d+e has a value of between 1 and 3,
optionally at least a portion of the other units being units of average formula:

$$L_g SiO_{\frac{4-g}{2}} \quad (B.2)$$

in which L has the same meaning as hereinabove and g has a value of between 0 and 3.

The dynamic viscosity $h_d$ (at 25° C.) of this polyorganosiloxane B≧5, preferably 10 and more preferably still is between 20 and 1000 mPa·s.

The polyorganosiloxane B can be formed solely of units of formula (II.1) or additionally comprises units of formula (B.2).

The polyorganosiloxane B can exhibit a linear, branched, cyclic or network structure. The degree of polymerization is greater than or equal to 2. More generally, it is less than 5000.

Examples of units of formula (B.1) are:

$$H(CH_3)_2 SiO_{1/2}, HCH_3 SiO_{2/2}, H(C_6H_5) SiO_{2/2}$$

The examples of units of formula (B.2) are the same as those given above for the units of formula (A.2).

Examples of polyorganosiloxane B are:
dimethylpolysiloxanes with hydrodimethylsilyl ends, poly(dimethylsiloxane)(methylhydrosiloxane)(α,ω-dimethylhydrosiloxane),
copolymers with dimethyl-hydromethylpolysiloxane (dimethyl) units with trimethylsilyl ends,
copolymers with dimethyl-hydromethylpolysiloxane units with hydrodimethylsilyl ends,
hydromethylpolysiloxanes with trimethylsilyl ends,
cyclic hydromethylpolysiloxanes.

The polyaddition silicone composition bases can comprise only linear polyorganosiloxanes A and B, such as, for example, those disclosed in Patents: U.S. Pat. Nos. 3,220,972, 3,697,473 and 4,340,709, or can at the same time comprise branched or networked polyorganosiloxanes A and B, such as, for example, those disclosed in Patents: U.S. Pat. Nos. 3,284,406 and 3,434,366.

The catalysts C are also well known. Use is preferably made of platinum and rhodium compounds. Use may in particular be made of the complexes of platinum and of an organic product disclosed in Patents U.S. Pat. Nos. 3,159,601, 3,159,602 and 3,220,972 and European Patents EP-A-0,057,459, EP-A-0,188,978 and EP-A-0,190,530 and the complexes of platinum and of vinylated organosiloxanes disclosed in Patents U.S. Pat. Nos. 3,419,593, 3,715,334, 3,377,432 and 3,814,730. The catalyst which is generally preferred is platinum. In this case, the amount by weight of catalyst C, calculated as weight of platinum metal, is generally between 2 and 400 ppm, preferably between 5 and 200 ppm, based on the total weight of the polyorganosiloxanes A and B.

The surfactant or surfactants present in the emulsion according to the invention as emulsifying agent (D) are nonionic or ionic in nature.

In practice, use may be made, as nonionics, of alkylphenyls, fatty alcohols or fatty acids carrying alkylene oxide groups, for example ethylene or propylene oxide, e.g.: nonylphenyl comprising between 9 and 30 ethylene oxide (EO) groups or oleic acid with 2 to 8 EO.

The ionic surfactants, preferably anionic surfactants, which can be employed are, e.g., sulphates, sulphonates, phosphates, sulphosuccinates, sulphosuccinamates, sulphoacetates or amino acid derivatives.

For further details regarding the available surfactants, reference will be made to the reference works, for example to the article which appeared in "Informations Chimie [Chemical Information], No. 146, June-July 1975, p. 119-126".

As regards the water-soluble emulsifying agents (D) of protective colloid type, it should be observed that, in addition to their emulsifying function, these protective colloids, such as PVAs, can also be active as promoters of anti-adhesiveness, of water repellency, indeed even of printability, as regards the field of paper anti-adhesiveness.

Poly(vinyl alcohol)s (PVAs) are compounds obtained indirectly from their esters by hydrolysis in aqueous medium or by alcoholysis in anhydrous medium. In practice, the esters used as starting material are commonly poly(vinyl acetate)s. The lysis of the esters resulting in the PVAs is generally incomplete. Acyl radicals remain in the molecule, the proportion of which influences the properties of the PVA, in particular its solubility. One form of definition of PVAs is therefore based on the indication of the ester number (E.N.), which is inversely proportional to the degree of hydrolysis. The E.N. is measured in a way known per se, by neutralization of any acid present in the poly(vinyl alcohol), saponification of the acyl groups and titration of the excess from alkaline saponification.

The poly(vinyl alcohol)s are also characterized by their degree of condensation, which can be evaluated by the determination of the dynamic viscosity of a typical solution (denoted by hdt in the present account), it being known that this variable increases as the degree of condensation increases. The viscosity $h_{dt}$ corresponds to the dynamic viscosity coefficient of a 4 weight % aqueous PVA solution measured at a temperature of 20±5° C. using an Ostwald viscometer.

Without these being limiting, examples may be given of poly(vinyl alcohol)s which provide satisfactory results with respect to the objectives targeted by the invention: these PVAs are those with an $h_{dt}$ of between 5 and 10 mPa·s and an E.N. of between 130 and 150.

The poly(vinyl acetate)s are conventional PVAs which can be used in the invention.

The catalytic system of this silicone elastomer emulsion of polyaddition type advantageously comprises at least one stabilizer E or retardant for the addition reaction (crosslinking inhibitor) chosen from the following compounds:
polyorganosiloxanes, advantageously cyclic polyorganosiloxanes, which are substituted by at least one alkenyl, tetramethylvinyltetrasiloxane being particularly preferred,
pyridine,
organic phosphines and phosphites,
unsaturated amides,
alkylated maleates,
and acetylenic alcohols.

These acetylenic alcohols (cf. FR-B-1,528,464 and FR-A-2,372,874), which are among the preferred thermal blockers for the hydrosilylation reaction, have the formula:

in which formula,
R is a linear or branched alkyl radical or a phenyl radical;
R' is H or a linear or branched alkyl radical or a phenyl radical;
it being possible for the R and R' radicals and the carbon atom situated α to the triple bond optionally to form a ring;
the total number of carbon atoms present in R and R' being at least 5, preferably from 9 to 20.

The said alcohols E are preferably chosen from those exhibiting a boiling point of greater than 250° C. Mention may be made, by way of examples, of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercial products.

Such a retardant E is present in a proportion of 3000 ppm at most, preferably in a proportion of 100 to 2000 ppm, with respect to the total weight of the organopolysiloxanes (A) and (B).

Furthermore, the emulsion according to the invention optionally comprises one or more additives F which can be, inter alia:
$F_1$=bactericidal agent, such as, for example, sorbic acid,
$F_2$=antigelling and/or wetting agent, such as, for example, glycols, such as propylene or ethylene glycol,
$F_3$=antifoam, advantageously selected from silicone antifoams, such as, for example, those sold by the Applicant Company under the tradename Rhodorseal®,
$F_4$=filler, preferably inorganic filler, chosen from siliceous or non-siliceous materials, siliceous fillers being more particularly preferred,
$F_5$=coadditives of synthetic latex type, in combination with the protective colloids D acting as emulsifiers and promoters of anti-adhesiveness (PVAs); it being possible for these synthetic latices to be, for example, butadiene (co)polymers, acrylics, vinyl acetates, and the like;
$F_6$=dye or pigment;
$F_7$=acidifying agent, such as, for example, acetic acid.

As regards the siliceous fillers $F_4$, it should be noted that they can act as reinforcing or semi-reinforcing filler.

The reinforcing siliceous fillers are chosen from colloidal silicas, fumed and precipitation silica powders or their mixture.

These powders exhibit a mean particle size generally of less than 0.1 mm and a BET specific surface of greater than 50 $m^2/g$, preferably of between 150 and 350 $m^2/g$.

Semi-reinforcing siliceous fillers, such as diatomaceous earths or ground quartz, can also be employed.

As regards the non-siliceous inorganic materials, they can be involved as semi-reinforcing inorganic filler or packing. Examples of these non-siliceous fillers which can be used alone or as a mixture are carbon black, titanium dioxide, aluminium oxide, hydrated alumina, expanded vermiculite, non-expanded vermiculite, calcium carbonate, zinc oxide, mica, talc, iron oxide, barium sulphate and slaked lime. These fillers have a particle size generally of between 0.001 and 300 mm and a BET specific surface of less than 100 $m^2/g$.

As for weight, it is preferable to employ an amount of filler of between 20 and 50, preferably between 25 and 35, % by weight with respect to all the constituents of the composition.

According to an advantageous provision of the invention, the proportion of water in the emulsion is greater than or equal to 50% by weight, preferably greater than or equal to 55% by weight and, for example, in practice of the order of 55-60% by weight or of 85 to 90% by weight.

According to another of its aspects, the present invention relates to a process for the preparation of an aqueous silicone emulsion which can be used in particular as coating base for the preparation of anti-adhesive and water-repellent coatings, this emulsion being of the type of that comprising:
at least one polyorganosiloxane (A) (POS) carrying Si-EU units with EU representing a group comprising at least one ethylenic unsaturation, preferably a vinyl unsaturation, and at least one POS (B) carrying Si—H units, the latter being capable of reacting by polyaddition with the Si-EU units;
a metal catalyst (C), preferably a platinum catalyst;
hydroxyl radicals capable of reacting with SiH units by dehydrogenation/condensation;
characterized in that it consists essentially in preparing a dispersion of silicone phase in water while taking care:
to fix the pH of the final emulsion between 5 and 9, preferably between 5.5 and 8.5 and more preferably still between 6 and 8,
and to see to it that this pH is permanently maintained.

Without this being limiting, this process represents one of the possibilities for obtaining, inter alia, the emulsion as described hereinabove.

In accordance with this process, the fixing and the maintenance of the pH are provided by addition to the emulsion, preferably when the latter comprises catalyst (C), of at least one agent (T) for fixing and maintaining the pH between 5 and 9, preferably between 5.5 and 8.5 and more preferably still between 6 and 8, this agent advantageously being a buffer system which, in an even more advantageous way, comprises the $HCO_3^-/CO_3^{2-}$ and/or $H_2PO_4^-/HPO_4^{2-}$ pair.

The process according to the invention is based on the fact that, contrary to all expectations, the use of an acidic pH within the window targeted above in the presence of a metal catalyst C preferably of platinum type makes it possible to stabilize the emulsion physically and chemically, in particular, by significantly limiting the dehydrogenation/condensation reactions.

It is essential for the addition of a buffer system to the emulsion to take place at the latest when the latter has the metal catalyst (C), e.g. of platinum, added to it, indeed even immediately after this addition of catalyst (C).

It is easily understood that the choice of the buffer system must be made while taking into account the pH and the composition of the emulsion. It is advisable in particular for the buffer system added not to interfere with the effects of the other ingredients of the emulsion.

This is because the latter comprises, in addition to the water, the following ingredients:
(A) at least one POS carrying, per molecule, at least two Si-EU units;
(B) at least one POS carrying, per molecule, at least three Si—H units;
(C) a metal-catalyst, preferably a platinum-catalyst;
(T) the agent or agents for fixing and maintaining the pH;
(D) at least one emulsifying agent preferably chosen from surfactants and/or protective colloids, and more preferably still from poly(vinyl alcohol)s (PVAs);

(E) optionally at least one stabilizer for the polyaddition reaction;

(F) optionally one or more additives;

A and B being incorporated in amounts such that the Si—H/Si-EU molar ratio is between 1 and 5, preferably between 1 and 3 and more preferably between 1.5 and 2.

It has already been indicated above that the limitation of the foaming and of the gelling reflects in the end the improvements introduced by the invention in terms of physical and chemical stability. It is also possible to size up the positive effects of the invention in terms of reactivity of the POS A and POS B crosslinking by polyaddition by assessing the gloss of crosslinked films obtained from the emulsion. This is because the more the reactivity is improved, the more the gloss increases.

According to a preferred arrangement of the invention, the following stages are carried out, successively or non-successively:

①—a base preemulsion $E_1$ is prepared which comprises the compounds A and optionally T and/or D and/or E and/or F;

②—a catalysing preemulsion $E_2$ is prepared which comprises C complemented by A and optionally T and/or D and/or E and/or F;

③—$E_1$ and $E_2$ are mixed in order to form the emulsion $E_3$;

④—all or at least a portion of the remainder of the agent T is added to $E_3$;

⑤—diluting is optionally carried out, preferably with water;

⑥—$E_3$ is optionally complemented using T and/or D and/or E and/or F.

According to this embodiment, each preemulsion $E_1$ or $E_2$ does not comprise the compounds A, B and C together, so that there is no risk of the crosslinking of A with B being initiated. These preemulsions $E_1$ and $E_2$ are therefore entirely stable on storage.

It is the same as regards the emulsion $E_3$ provided that the latter comprises the stabilizer or the inhibitor E for the polyaddition reaction. This stabilizer E blocks the crosslinking at room temperature. On the other hand, its effect is no longer felt as soon as the temperature of the emulsion exceeds a certain threshold. This threshold for activation of the crosslinking by polyaddition is, for example, of the order of 50° C.

According to an even more preferred alternative form of the process according to the invention, the aim is to produce an emulsion which comprises a silicone phase dispersed in the form of droplets of three different types:

those formed essentially of POS A, those formed essentially of POS B, those comprising catalyst C and at least one POS which can be in particular POS A and/or POS B, preferably POS A.

According to this preferred embodiment, stage ① consists:

☐ 1.1. ☐ in producing a preemulsion $E_{11}$ from water, from POS A and preferably from emulsifying agent D and from stabilizer E, ☐ 1.2. ☐ in producing a preemulsion $E_{12}$ from POS B and preferably from emulsifying agent D and from an acidifying additive F and/or from other additives F and optionally from stabilizer E, ☐ 1.3. ☐ in mixing $E_{11}$ with $E_{12}$ in order to produce $E_1$, ☐ 1.4. ☐ in optionally adding other additives F;

stage ② consists in producing an emulsion $E_2$ based on POS A or B, preferably A, on catalyst C, on emulsifying agent D and on additives F (e.g., antigels, wetting agents and bactericides and optionally antifoams).

Thus, the emulsion formulation according to the invention is a mixture of two preemulsions, namely a base preemulsion $E_1$ and a catalysing preemulsion $E_2$, so as to produce an emulsion $E_3$ which may or may not be diluted with water so as to adjust the silicone content on a dry basis according to the targeted application (silicone deposit desired, type of substrate treated and coating technique).

As soon as there is available an emulsion $E_3$ which has or has not been prepared by the process described hereinabove and which exhibits the advantage of being subject neither to foaming nor to gelling, it is particularly advantageous to be able to use it in applications for the manufacture of crosslinked silicone polymers and in particular of anti-adhesive silicone coatings.

It follows that, according to another of its subject-matters, the present invention relates to a process for preparing a coating, in particular an anti-adhesive and water-repellent coating, on a fibrous or non-fibrous substrate, preferably made of paper, characterized in that it consists:

in coating the substrate with the emulsion described hereinabove and/or as obtained by the process described above, and in seeing to it that the coated layer crosslinks by providing, preferably, thermal activation.

The coating is carried out according to known and appropriate means, for example with a doctor blade or with a roller of size press or gate roll type.

The means for thermal activation of the crosslinking are conventionally ovens (for example tunnel ovens), indeed even infrared sources. This thermal activation can be completed by actinic activation and/or by electron bombardment.

The coated substrates are preferably fibrous substrates and more preferably still substrates made of paper or the like. In this application, the degree of coating is less than or equal to 1.2 g of silicone/$m^2$ of substrate, preferably less than or equal to 0.9 g/$m^2$ and more preferably still less than or equal to 0.50 g/$m^2$.

Mention may be made, as other examples of substrates, of those composed of synthetic polymers, such as polyethylenes, polypropylenes or polyesters, or alternatively of natural polymer.

It is obvious that the substrates can be provided in any other form than that of sheet or film.

According to a favoured application of the emulsion according to the invention, the fibrous or non-fibrous substrate comprises, on at least one of its faces, an anti-adhesive and water-repellent (optionally printable) coating obtained by crosslinking the said emulsion. More specifically, this substrate can comprise the anti-adhesive and water-repellent coating on one of these faces and an adhesive coating on the opposite face. In this implementation, articles such as self-adhesive labels, sheets, tapes or the like which have the properties of being water repellent and printable and which can stick reversibly to one another are envisaged in particular. The latter characteristic is particularly advantageous for self-adhesive labels, as it makes it possible to dispense with conventional anti-adhesive substrates.

It is obvious that the invention is not limited to substrates with opposite adhesive/anti-adhesive faces. It also encompasses all substrates coated solely with a printable adhesive layer, which substrates can be printed and used as such, for example as protective means.

The examples which follow of the preparation of the silicone emulsion under consideration and of its application as anti-adhesive and water-repellent coating for paper substrates will make possible a better understanding and grasp of the invention. They will also reveal the alternative forms and the advantages of the said invention, the performance of which in terms of stability will be underlined by comparative tests.

EXAMPLES

Example 1

Preparation

A—An emulsion $E_{11}$ is prepared with approximately 2 wt % of poly(vinyl alcohol) with a degree of hydrolysis of 88 molar % and with a molecular mass of approximately 90,000. The emulsified silicone oil A represents approximately 38 wt % of the emulsion. The POS A is a polysiloxane comprising vinyl groups in the chain and at the chain end. The content of vinyl groups is approximately 11 wt % (mass 27). This vinylated oil A also comprises the stabilizer E for the chemical polyaddition reaction, namely ethynylcyclohexanol, approximately 0.15 wt % with respect to the vinylated silicone oil A.

The crosslinking agent is added in the form of an emulsion $E_{12}$ prepared with a mixture of nonionic surfactants D which are formed by nonylphenyls comprising 9 and 30 ethylene oxide groups, approximately 2.55 wt %. The silicone oil B which acts as crosslinking agent represents approximately 60 wt % of the emulsion B reacts with the abovementioned vinyl groups. C is a hydropolysiloxane oil B with a content of "SiH" reactive groups (mass 29) of approximately 1.05 groups per 100 g of hydropolysiloxane oil. The emulsion $E_{12}$ comprising the crosslinking agent is acidified with acetic acid $F_7$, approximately 0.12 wt %, as it is in an aqueous acidic medium with a pH of between 4.5 and 5.5 that the "SiH" groups are the most stable. The remainder to 100 wt % of the crosslinking emulsion is provided by ultrafiltered and osmotically-treated water.

$E_{11}$ and $E_{12}$ are mixed in order to produce the base emulsion $E_1$.

This base emulsion $E_1$ also comprises a bactericidal agent $F_1$, sorbic acid, approximately 0.05 wt %, and an antifreezing and wetting agent $F_2$ (propylene glycol), approximately 3.5 wt %. The abovementioned crosslinking emulsion $E_{12}$ is added in an amount such that the "SiH/SiVi" ratio is equal to approximately 1.7. The remainder to 100 wt % of the base emulsion $E_1$ is provided by ultrafiltered and osmotically-treated water.

B—The catalyst for the polyaddition reaction is added to the base emulsion $E_1$ in the form of an emulsion $E_2$ obtained by emulsifying a catalysing mixture using an emulsifying agent D formed by approximately 2.0 wt % of poly(vinyl alcohol) with a degree of hydrolysis of 88 molar % and with a molecular mass of approximately 90,000.

The catalysing mixture is obtained by diluting the karsted catalyst C (as disclosed in the literature) in a vinylated silicone oil, such that the overall level of platinum in the catalysing emulsion is approximately 300 ppm, expressed as platinum metal, and so that the level of silicone in the emulsion $E_2$ is in the region of 38 wt %. The dilution silicone oil is an organopolydimethylsiloxane oil comprising approximately 0.38 wt % of chain-end vinyls (mass 27).

This emulsion $E_2$ also comprises a mixture, approximately 0.1 wt %, of nonionic surfactants F, in this case nonylphenyl comprising 9 and 30 ethylene oxide groups, and approximately 3.5 wt % of propylene glycol antifreezing and wetting agent $F_2$, as well as approximately 0.05 wt % of sorbic acid, the bactericidal agent $F_1$.

The base emulsion $E_1$ and the catalysing emulsion $E_2$ thus described are mixed in the proportion of 100 parts of base emulsion $E_1$ per 12 parts of catalysing emulsion $E_2$, in order to obtain the emulsion $E_3$. In accordance with the invention, a buffer system T formed by $NaHCO_3$ is incorporated in the emulsion $E_3$.

This mixture is subsequently diluted with water, approximately 196 parts, so as to have, in the bath, a silicone content on a dry basis of approximately 15 wt %.

A silicone antifoam $F_3$ may or may not be added to this mixture in order to eliminate mechanical foams.

This bath, thus prepared, has the property, once coated on a substrate and after heating in order to remove the water and to polymerize the silicone, of giving a solid silicone film at the surface of the substrate.

Example 2

Evaluation of the Stability of the Emulsions According to the Invention 2.1. 300 ml samples of bath $E_3$ are prepared comprising:

100 g of base emulsion $E_1$ described hereinabove, 12 g of catalysing emulsion $E_2$ described hereinabove, 196 g of ultrafiltered and osmotically-treated dilution water, so as to have an ultrapure water, 0 or 0.12 g of sodium bicarbonate.

These 300 ml of emulsion $E_3$ are introduced into a 500 ml stainless steel beaker and are positioned on a support, so that the beaker is immersed in the water of the thermostatically-controlled bath.

The bath is stirred by a motor which can rotate at from 100 to 2000 rev/min; the rotor is a marine propeller with a diameter of 45 mm.

The bath is therefore stirred for 4 hours at 1000 rev/min at 40° C.

From beginning the stirring to 4 hours later, a sample is withdrawn every hour, so as to test the activity in an oven. A portion of the sample is coated onto a given substrate (sulpack BNL from Ahlstrom paper group) with a Meyer bar No. 0.15, silicone deposit approximately 1.0 g/m². This coating is subsequently placed in a ventilated oven at a given temperature, in this instance 110° C. It is necessary to look for the minimum time in order to have correct polymerization of the silicone, evaluated by the adhesive tape test. A silicone polymerization is said to be correct according to the adhesive tape test when an adhesive tape, applied to the coating, detached from the coating and stuck back on itself (the two adhesive faces), adheres to itself.

After maintaining for 4 hours under the conditions described hereinabove, the stirring is halted and all the bath remaining in the beaker is filtered through a 400 μm Nylon filter and the solid foams and gels recovered in the filter are washed with large amounts of water and dried in an oven for 30 min at 150° C. The weight of gel obtained gives quantitatively the chemical stability of the bath, that is to say the ability of the bath to form solid foams and/or gels.

Monitoring the polymerization rate described hereinabove makes it possible to evaluate the survival of the reactivity over time and thus indirectly the chemical stability of the bath, as any reactive or catalytic component which has disappeared results in a decrease in the chemical reactivity.

2.2. RESULTS

|  | Formulation 1 in parts | Formulation 2 in parts | Formulation 3 in parts | Formulation 4 in parts | Formulation 5 in parts |
|---|---|---|---|---|---|
| Emulsion $E_1$ | 100.00 | 100.00 | 100.00 | 100.00 | 100.00 |
| Emulsion $E_2$ | 12.00 | 12.00 | 10.00 | 8.00 | 6.00 |
| Dilution water | 196.00 | 196.00 | 196.00 | 196.00 | 196.00 |
| Sodium bicarbonate | 0.00 | 0.12 | 0.12 | 0.12 | 0.12 |

| | Polymerization time in seconds | | | | |
|---|---|---|---|---|---|
|  | t = 0 | t = 1 hour at 40° C. | t = 2 hours at 40° C. | t = 3 hours at 40° C. | t = 4 hours at 40° C. |
| Formulation 1 | 15 | 25 | >90 | >90 | >90 |
| Formulation 2 | 15 | 15 | 15 | 15 | 15 |
| Formulation 3 | 15 | 15 | 17 | 15 | 15 |
| Formulation 4 | 17 | 22 | 22 | 22 | 17 |
| Formulation 5 | 45 | 45 | 45 | 45 | 60 |

| | % of gel formed after 4 hours at 40° C. with stirring |
|---|---|
| Formulation 1 | 2 |
| Formulations 2 to 5 | 0 |

| | Chemical foaming, hard and thick foams |
|---|---|
| Formulation 1 | significant |
| Formulations 2 to 5 | none |

% of gel formed after 4 hours with stirring=amount of gel formed/amount of silicone introduced.

For a given silicone formulation, the polymerization rate depends on the temperature of the ovens and on the residence time of the substrate in these ovens.

The invention claimed is:

1. An aqueous silicone emulsion comprising:
   a. at least one polyorganosiloxane (A) comprising Si-EU units where EU represents a group comprising at least one ethylenic unsaturation, said polyorganosiloxane being present in emulsion droplets, wherein said emulsion droplets further comprise at least one stabilizer which is an inhibitor of a Si—H/Si-EU polyaddition reaction and is selected from the group consisting of pyridine, organic phosphines, organic phosphites, unsaturated amides, and alkylated maleates,
   b. at least one polyorganosiloxane (B) comprising SiH units; the latter being capable of reacting by polyaddition with the Si-EU units,
   c. a metal catalyst,
   d. hydroxyl radicals capable of reacting with SiH units by dehydrogenation/condensation, and
   e. at least one buffer agent which maintains the pH of the emulsion between 5.5 and 8.5 and is present in an amount that, when combined with the other components of the mixture, is sufficient to eliminate or significantly reduce the formation of a foam or a gel.

2. The silicone emulsion according to claim 1, wherein EU represents a vinyl unsaturation, and the pH of the emulsion is between 6 and 8.

3. The silicone emulsion according to claim 1, wherein the non-aqueous dispersed silicone phase comprises:
   at least one polyorganosiloxane (A) having, per molecule, at least two Si-EU units;
   at least one polyorganosiloxane (B) having, per molecule, at least three Si—H units;
   a metal catalyst;
   at least one agent for adjusting and maintaining the pH;
   at least one emulsifying agent;
   at least one stabilizer for the polyaddition reaction; and
   optionally, one or more additives.

4. The silicone emulsion according to claim 3, wherein:
   the metal catalyst is a platinum catalyst; and
   the at least one emulsifying agent is a surfactant or a protective colloid.

5. The silicone emulsion according to claim 4, wherein:
   the surfactant is poly(vinyl alcohol).

6. The silicone emulsion according to claim 1, wherein the non-aqueous dispersed silicone phase has the following characteristics:
   the concentration of the metal catalyst is 30 to 200 ppm;
   the amount of the at least one emulsifying agent (D) is 0.01 to 10 parts per 100 parts of the total mass of the polyorganosiloxane (A) and polyorganosiloxane (B);
   the concentration of the at least one stabilizer is up to 5000 ppm; and
   the concentration of the one or more additives is 0 to 10 ppm;
   wherein the polyorganosiloxane (A) and polyorganosiloxane (B) are present with a SiH/SiVi molar ratio of between 1 and 5; and
   the at least one agent for adjusting and maintaining the pH being present in an amount sufficient to maintain the pH;
   where the concentrations is on a dry weight basis with respect to the total mass of the polyorganosiloxane (A) and polyorganosiloxane (B).

7. The silicone emulsion according to claim 6, wherein:
   the concentration of the metal catalyst is 80 to 120 ppm;
   the amount of the at least one emulsifying agent is 0.05 to 5 parts;
   the concentration of the at least one stabilizer is 500 to 2000 ppm;
   the concentration of the one or more additives is 0 to 5 ppm; and
   the SiH/SiVi molar ratio is between 1.5 and 2.

8. The silicone emulsion according to claim 1, wherein the emulsion comprises at least three different families of droplets of dispersed silicone phase, where
   family d1 consists essentially of polyorganosiloxane (A) and devoid of the catalyst;
   family d2 consists essentially of polyorganosiloxane (B) and devoid of the catalyst; and
   family d3 comprises the catalyst; and
   the droplets of at least one of these families comprise at least one stabilizer.

9. A process for the preparation of an anti-adhesive and water-repellent coating, on a fibrous or non-fibrous substrate, comprising the steps of:
   a) forming a coated layer of the emulsion as defined in claim 1 on the substrate, and
   b) crosslinking the coated layer.

10. The process for the preparation of an anti-adhesive and water-repellent coating according to claim 9, wherein the crosslinking is provided by thermal activation.

11. A process for the preparation of an aqueous silicone emulsion, said process comprising:
   a. preparing a base preemulsion $E_1$ comprising polyorganosiloxane (A) and polyorganosiloxane (B) and optionally at least one agent for adjusting and maintaining the pH, and/or at least one emulsifying agent, and/or at least one stabilizer for the polyaddition reaction; and/or one or more additives;
   b. preparing a catalysing preemulsion $E_2$ comprising the catalyst and polyorganosiloxane (A) and optionally at least one agent for adjusting and maintaining the pH, and/or at least one emulsifying agent, and/or at least one stabilizer for the polyaddition reaction; and/or one or more additives;
   c. forming an emulsion $E_3$ by mixing base preemulsion $E_1$ and catalysing preemulsion $E_2$, and optionally adding to emulsion $E_3$ at least one agent for adjusting and maintaining the pH, and/or at least one emulsifying agent, and/or at least one stabilizer for the polyaddition reaction; and/or one or more additives;
   d. adding at least a portion of the agent for adjusting and maintaining the pH to emulsion $E_3$;
   e. optionally, diluting emulsion $E_3$; and
   f. optionally adding at least one agent for adjusting and maintaining the pH; and/or at least one emulsifying agent; and/or one or more additives,
   wherein at least one stabilizer for the polyaddition reaction is present in at least one of $E_1$, $E_2$ and $E_3$,
   wherein the agent for adjusting and maintaining the pH is present in an amount that, when combined with the other components of the mixture, is sufficient to eliminate or significantly reduce the formation of a foam or a gel.

12. The process according to claim 11, wherein:
   the catalyst (C) is a platinum catalyst; and the pH is between 6 and 8.

13. The process according to claim 11 comprising at least one emulsifying agent, wherein:
   the polyorganosiloxane (A) has, per molecule, at least two Si-EU units;
   the polyorganosiloxane (B) has, per molecule, at least three Si—H units;
   the metal catalyst is a platinum catalyst;
   the emulsifying agent is poly(vinyl alcohol); and
   polyorganosiloxane (A) and polyorganosiloxane (B) are present with a Si—H/Si-EU molar ratio of between 1 and 5.

14. the process of claim 11, wherein:
   step a), preparing the base preemulsion $E_1$, comprises the steps of:
      a1. producing a preemulsion $E_{11}$ by mixing water and polyorganosiloxane (A) and optionally an emulsifying agent and a stabilizer;
      a2. producing a preemulsion $E_{12}$ from polyorganosiloxane (B) and optionally an emulsifying agent and an acidifying additive and/or from other additives and optionally from stabilizer, and
      a3. producing an emulsion $E_1$ by mixing preemulsion $E_{11}$ with preemulsion $E_{12}$, and optionally adding other additives; and
   step b), preparing the catalysing preemulsion $E_2$, comprises the step of combining polyorganosiloxane (A) or(B) the catalyst C, an emulsifying agent and additives.

* * * * *